May 1, 1928.

C. B. WOODWORTH

POULTRY AND RABBIT CAGE

Filed March 12, 1927

1,667,998

INVENTOR

C. B. Woodworth

BY

ATTORNEY

Patented May 1, 1928.

UNITED STATES PATENT OFFICE.

CLARENCE B. WOODWORTH, OF JACKSON, CALIFORNIA.

POULTRY AND RABBIT CAGE.

Application filed March 12, 1927. Serial No. 174,978.

This invention relates to improvements in cages in which live rabbits, poultry and similar game are placed in quantities and kept therein while being marketed. Such cages are usually initially filled with the game which are removed as sold by opening the lid or the door of the cage and inserting a hand or arm. As long as the cage is substantially full it is easy to catch any individual member of the game, but as their number becomes lessened and the space for their movement in the cage correspondingly increases, it becomes very hard to catch the remaining animals or birds, since when the hand of the operator is inserted through the door the occupants fly or move from one point to another of the cage in an endeavor to avoid being caught.

The principal object of my invention therefore is to provide a cage for the above purpose so constructed that as the number of occupants in the cage is lessened the space occupied may be instantly and correspondingly lessened and the occupants drawn toward the exit opening, so that said occupants cannot move around freely when it is desired to catch them, and no time is lost in performing this operation.

This valuable feature may be incorporated in a cage regardless of the size of the same, so that it is possible to use a much larger cage than is now practicable, since the dimensions of ordinary cages are limited at least to the length of the human arm, since otherwise it would be impossible to catch the last remaining occupants in the cage except by accident.

My improved easy catching arrangement may be also readily installed in old cages. The cages are also so constructed that they may be stacked one upon the other and may be left in that position when the game is being kept therein, and removed therefrom when necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
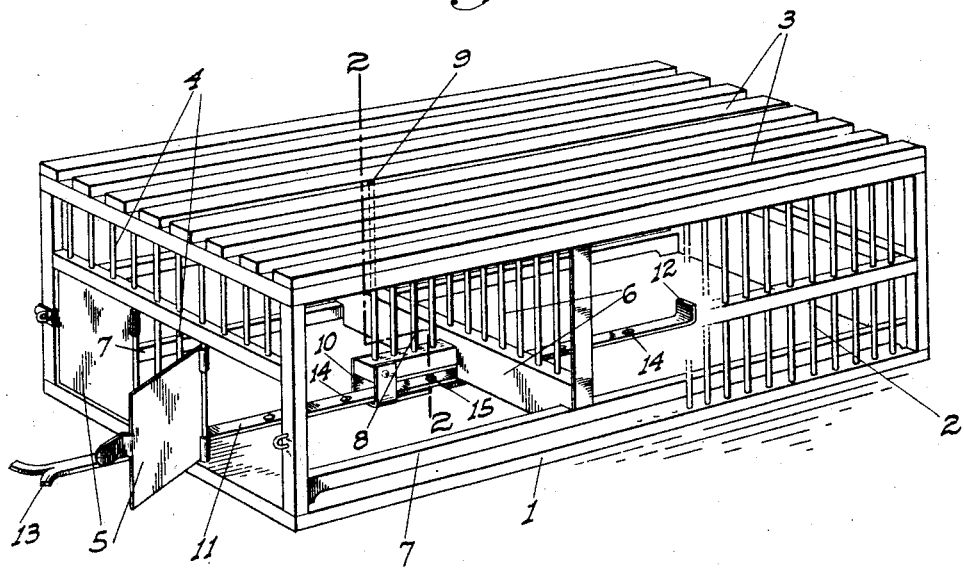
Fig. 1 is a perspective elevation of my improved cage with the near side partly omitted to better show the interior structure.

Referring now more particularly to the characters of reference on the drawings, the cage itself is a rectangular structure of suitable dimensions and comprises essentially a bottom member 1, sides and the rear end preferably formed of vertical longitudinally spaced rods 2, and a top constructed of longitudinally and transversely spaced slats 3. Any other freely ventilated construction may however be used if desired. The front end of the cage is also formed partly of vertical rods 4, which however are cut away in places to form openings of necessary size normally closed by separate doors 5. These doors extend from the bottom of the cage upwardly a certain distance and are disposed in spaced relation on each side of the central transverse plane of the cage.

Mounted in the cage for sliding movement lengthwise thereof is a transverse partition 6 of suitable construction, which is supported and guided by longitudinally extending guide cleats 7 mounted at the bottom and along the sides of the cage. Secured to and projecting from the forward face of the transverse partition is a centrally disposed vertical partition 8, which adjacent its outer end is provided with an upstanding pin 9 or the like which projects between an adjacent pair of the top slats 3 so as to form additional guide means for the partition structure. The extent of the longitudinal partition is such that when its outer end is moved to adjacent the front end of the cage (where it will of course lie between the doors) said partition, together with the transverse partition, form small cage compartments with the adjacent walls of the cage itself, of a size sufficient to hold at the most only a few rabbits or birds. When the sliding partition structure is thus moved therefore it is an easy matter upon opening either door and inserting the hand to catch any of the game in the corresponding compartment, since such game cannot escape toward the unoccupied portion of the cage rearwardly of the transverse partition. When the cage is initially full the partition structure is moved to the rear end of the cage, so that the entire area of the cage is then available for use. As the game in the cage becomes depleted the partition structure is gradually shifted the necessary distance toward the front end so as to limit the space for the movement of the game, while any of them are being caught. Between catching birds however the partition may if desired be again retracted so that the game may then have all possible freedom of movement.

Figure 2:
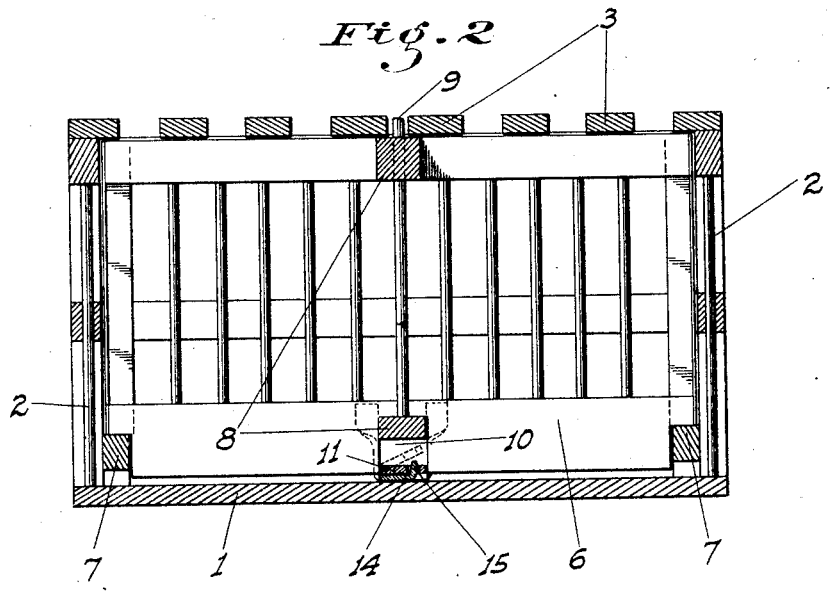
Fig. 2 is a cross section of the cage on the line 2—2 of Fig. 1.

While different devices for shifting the partition may be employed, I preferably make use of the following means:

The bottom of the partition structure is provided with a longitudinally extending substantially rectangular passage 10 forming a guide and locating means for a flat bar 11 whose length is not less than that of the cage. This bar is freely slidable through the passage and on its inner end has an upstanding flange 12 to prevent the passage of that end of the bar beyond the adjacent end of the passage. The bar projects through and beyond the front of the cage between the doors and at its forward end has a suitable handle means 13 thereon. The bar is provided at spaced intervals with orifices 14 adapted to be selectively engaged with a vertical pin 15 mounted in connection with the partition structure and projecting upwardly into the passage 10. The width of this passage is such as to hold the bar against undesired lateral movement. The height of the passage however is such as to enable the bar to be tilted laterally as shown in dotted lines in Fig. 2, so as to enable the pin 15 to be disengaged from any orifice in the bar. This permits the bar while being maintained in its tilted position to be moved longitudinally without moving the partition, so as to enable another orifice 14 to engage the pin 15. This enables the bar to be maintained inside the cage for the major portion of its length at all times when not actually being used, and irrespective of the position of the partition; and avoids the inconvenience which would arise if the bar necessarily projected a considerable distance from the front of the cage.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A cage comprising an enclosing structure, transversely spaced doors in one end thereof, a transverse longitudinally movable partition in the structure, and a longitudinal partition member projecting from the side of the transverse portion facing the door-end of the structure and disposed in a transverse plane between the doors.

2. A cage comprising an enclosing structure having a door in one end, a transverse longitudinally movable partition in the structure, a longitudinal shifting bar projecting from one end of the cage, a bar guiding member provided with the partition and arranged to permit of limited vertical movement of the bar, and a pin projecting upwardly from the guide member, said bar having a plurality of longitudinally spaced orifices to selectively receive the pin.

In testimony whereof I affix my signature.

CLARENCE B. WOODWORTH.